United States Patent

Parnell

[15] 3,683,402
[45] Aug. 8, 1972

[54] CAPACITIVE TRANSDUCER DRIVE MECHANISM FOR THE RECORDING PEN OF A GRAPHICAL RECORDER

[72] Inventor: James A. Parnell, Houston, Tex.
[73] Assignee: Bausch & Lomb Incorporated, Rochester, N.Y.
[22] Filed: Nov. 12, 1970
[21] Appl. No.: 88,556

Related U.S. Application Data

[63] Continuation-in-part of Ser. No. 688,500, Dec. 6, 1967, abandoned.

[52] U.S. Cl. .................... 346/32, 317/250, 318/662, 340/200, 346/139 R
[51] Int. Cl. .............................................. G01d 3/06
[58] Field of Search .......... 346/32, 31, 139; 318/662; 340/200, 187; 317/250, 255, 249, 246, 251

[56] References Cited

UNITED STATES PATENTS 2,581,680   1/1952   Martenot ............... 317/250 X
3,315,266   4/1967   Lapinski .................... 346/32
3,340,536   9/1967   Sauber ........................ 346/32

Primary Examiner—Joseph W. Hartary
Attorney—Frank C. Parker and Saul A. Seinberg

[57] ABSTRACT

A variable capacitive transducer is employed in a graphical recording device in conjunction with its pen drive mechanism. Two fixed conductive plates are mounted within the recorder parallel to each other and a flexible belt, partly coated with a conductive film, is movably mounted therebetween. The recording pen is attached to the belt which serves as both the feedback element in the pen drive servo system and pen conveyor. Since the pen is attached directly to the belt which, in turn, provides a highly accurate indication of pen position, there is no need to provide any mechanical means for converting the pen's linear motion to rotary motion which avoids the attendant conversion errors.

8 Claims, 15 Drawing Figures

PATENTED AUG 8 1972

JAMES A. PARNELL
INVENTOR.

BY

SAUL A. SEINBERG

ATTORNEY

JAMES A. PARNELL
INVENTOR.

BY
SAUL A. SEINBERG

ATTORNEY

JAMES A. PARNELL
INVENTOR.

BY
SAUL A. SEINBERG

ATTORNEY

JAMES A. PARNELL
INVENTOR.

BY
SAUL A. SEINBERG

ATTORNEY

3,683,402

CAPACITIVE TRANSDUCER DRIVE MECHANISM FOR THE RECORDING PEN OF A GRAPHICAL RECORDER

CROSS-REFERENCES TO RELATED APPLICATIONS

This application is a continuation-in-part of my copending application, Ser. No. 688,500, filed on Dec. 6, 1967, now abandoned and filed as copending application Ser. No. 89,514 on Nov. 13, 1970 and both assigned the same assignee as the present invention.

BACKGROUND OF THE INVENTION

1. Field of the Invention

This invention relates to capacitive transducers and more particularly to the use of a capacitive transducer in a graphical recorder.

2. Description of the Prior Art

In the field of instrumentation and control, quantities to be measured, such as displacement, flow rate, pressure, etc., are generally converted into electrical signals by means of transducers. Generally the measured quantity is converted into, or is, a linear or an angular displacement. The transducers sense the amount of displacement and generate a corresponding electrical signal. The signal can have a linear relation with respect to the displacement, or non-linear, such as in the case of a logarithmic function.

The transducers are frequently installed as feedback elements in servo systems, such as in recorders, to provide an indication of the displacement or position of a mechanical element, such as a recorder pen. In this environment the transducer is subject to long periods of operation, frequently measuring displacement over a small portion of its range, and often in a fluctuating mode, such as in the case of recording or monitoring low amplitude alternating signals. Hence, it is advantageous to use transducers having no critical sliding contacts which can wear and cause scaling variations and noise. In addition, since accuracy is generally of prime importance, the transducers should have infinite resolution, excellent repeatability and stability, and should be capable of accurately generating the desired linear or non-linear input-to-output relationship. Furthermore, the transducer should exhibit low inertial and friction loading. The transducer should also be relatively insensitive to forces transverse to its normal direction of measurement to allow its use in areas of high vibration. In addition to the foregoing requirements, the transducer should be relatively inexpensive.

At the present time slidewire potentiometers are being extensively used as displacement transducers, particularly in servo systems employed in recorders. This is primarily due to their low cost. Unfortunately, the potentiometers are susceptible to mechanical wear. As a result, the potentiometers often determine the operational life of the system in which they are employed, particularly if oscillated for extended periods over a small portion of their range. Furthermore, the resolution from low cost potentiometers, such as wire wound potentiometers, is limited to the spacing between wires. The slidewire also often places an undesirable friction load on the moving mechanical input member. Various types of deposited film potentiometers are also available. While these devices do exhibit infinite resolution and somewhat longer mechanical life than the wire wound types, units with excellent linearity are not available except at relatively great expense.

Various non-contacting transducers are currently available, such as the differential transformers, (LVDT), resolvers and capacitive transducers. None of these currently available devices have been found to include the above-mentioned combination of requirements. In the case of the differential transformer and the capacitive transducer, the useable mechanical dynamic range, or stroke of the input member is generally limited. Furthermore, except for very expensive units, these devices do not exhibit sufficient linearity. In the case of resolvers and differential transformers, it is extremely difficult, if not impractical, to achieve various non-linear input-to-output relationships. In any case, the presently available devices have been found to be prohibitive in cost if accuracy, repeatability, range and resolution, among other things, are required in a single device.

It is therefore an object of the invention to provide a new and improved displacement to electrical signal conversion apparatus fulfilling the requirements stated above.

It is also an object of this invention to provide a new and improved capacitive displacement transducer providing precise indication of displacement at relatively low cost.

It is a further object of the invention to provide a new and improved capacitive displacement transducer that is substantially insensitive to forces applied transversely to the direction of movement, or the axis of rotation, of the transducer.

It is still another object of the present invention to provide a new and improved capacitive transducer which fulfills all of the above-mentioned objectives and which is particularly suitable for use in a graphical recorder.

SUMMARY OF THE INVENTION

The capacitive displacement transducer of the invention includes three conductive plates juxtapositioned in substantially parallel relation. Input electrical signals are applied to one of the outer conductive plates. The other two conductive plates are effectively maintained at substantially the same signal level to minimize the capacitive effect between the plates so that the center plate acts as a shield to control the capacitive coupling between the two outer plates. An output circuit is coupled to the other outer plate to develop an electrical signal having an amplitude that is a function of the capacitive coupling between the two outer plates, as determined by the position of the inner plate relative to the two outer plates. Preferably, the center plate is coupled to move with the displacement to be measured, although the center plate can be held stationary and the outer plates moved instead. Furthermore, the motion can be linear or angular, provided the outer plates remain in substantially parallel relation.

In a first embodiment of the invention, the center plate and one outer plate are effectively maintained at substantially the same signal level by grounding the center plate and connecting the output plate to an amplifier including negative feedback for maintaining this plate at virtual ground.

In another embodiment of the invention the center plate and the output plate are interconnected by a unity gain amplifier to effectively maintain the two plates at substantially the same signal level.

A further feature of the invention includes separating the output outer plate into a plurality of separated active areas and including a switching circuit to provide for continuous displacement measurement in the case of an angular motion capacitive transducer.

Yet another embodiment of the invention illustrates the employment thereof in conjunction with the pen drive mechanism of a graphical recorder. In this embodiment, the movable plate is replaced by a flexible belt having a conductive film thereon which is moved between two fixed plates. The recording pen is mounted to the belt which is driven by the pen drive servo system.

DESCRIPTION OF THE PREFERRED EMBODIMENTS

Figure 1:
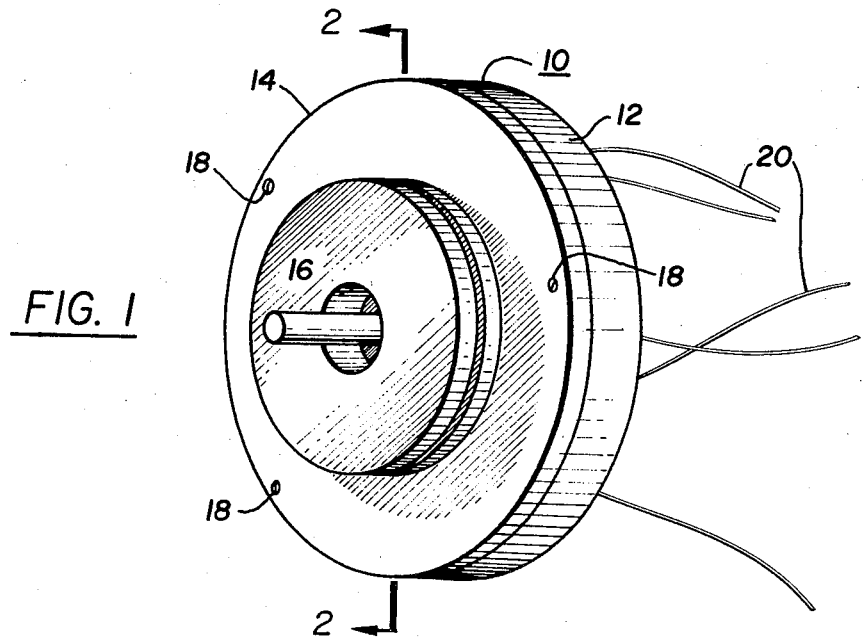
FIG. 1 is a perspective view of a housing for a capacitive transducer including the invention.
Figure 2:
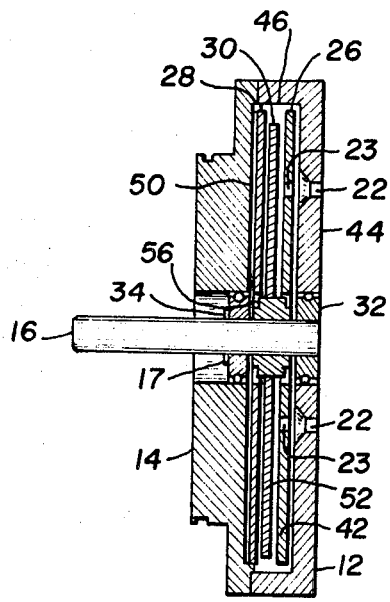
FIG. 2 is a cross-sectional view of the embodiment of FIG. 1 taken along the line 2—2.

The capacitive transducer of the invention is described in the context of two stationary plates and a rotary movable capacitive plate mounted therebetween. However, it must be understood that the apparatus so described can be easily modified in accordance with the teachings of this invention to provide for a linear motion capacitive transducer, including two stationary plates and a movable plate mounted for straight line motion therebetween. The housing for capacitive transducer 10 illustrated in FIG. 1, includes back and front covers 12 and 14, respectively, for mounting the capacitive elements therebetween. A rotatable input shaft 16 extending from the housing is adapted to be coupled to the mechanical input element, the angular displacement of which is to be measured. The front and back covers are fastened together by the screws 18. The shaft 16 is held in position by a "C" clamp 17 (FIG. 2). Electrical connections to the capacitive transducer are made by the wires 20 extending from the back cover 12.

Figure 10:
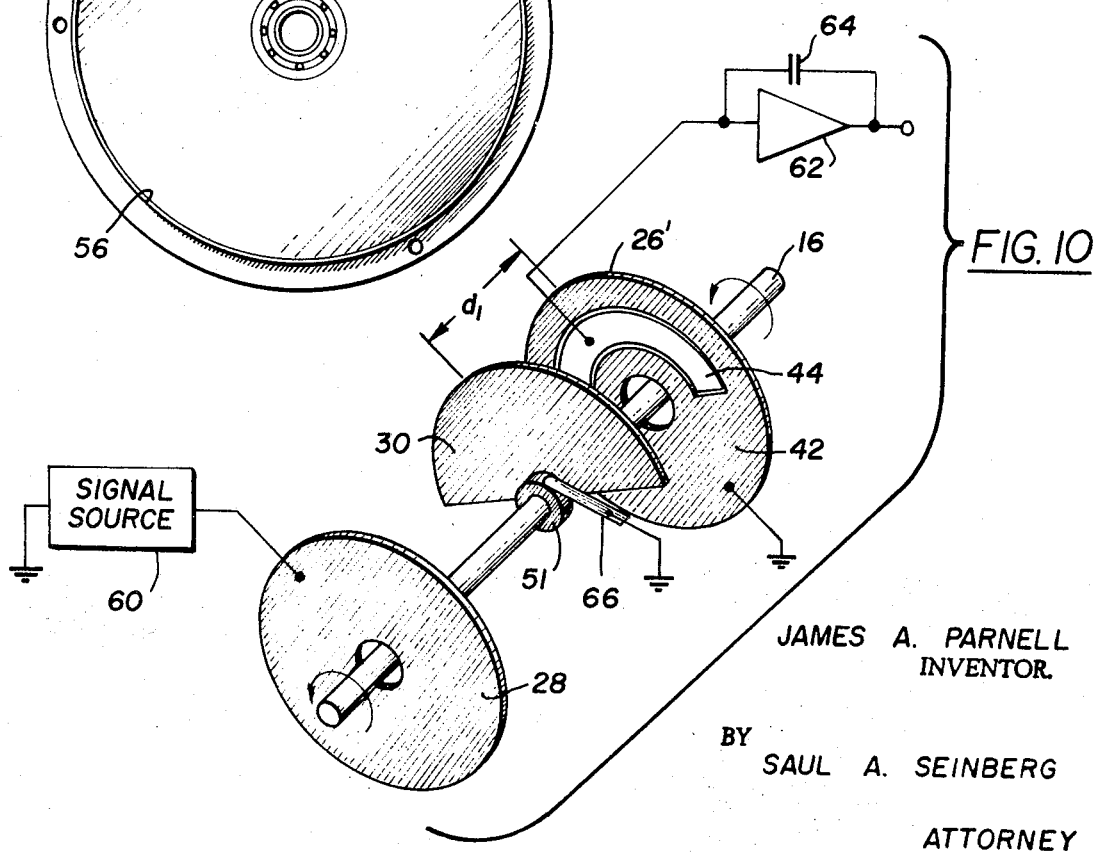
FIG. 10 is a schematic diagram of the capacitive transducer of the invention including a first embodiment of the electrical connections made thereto.
Figure 12:
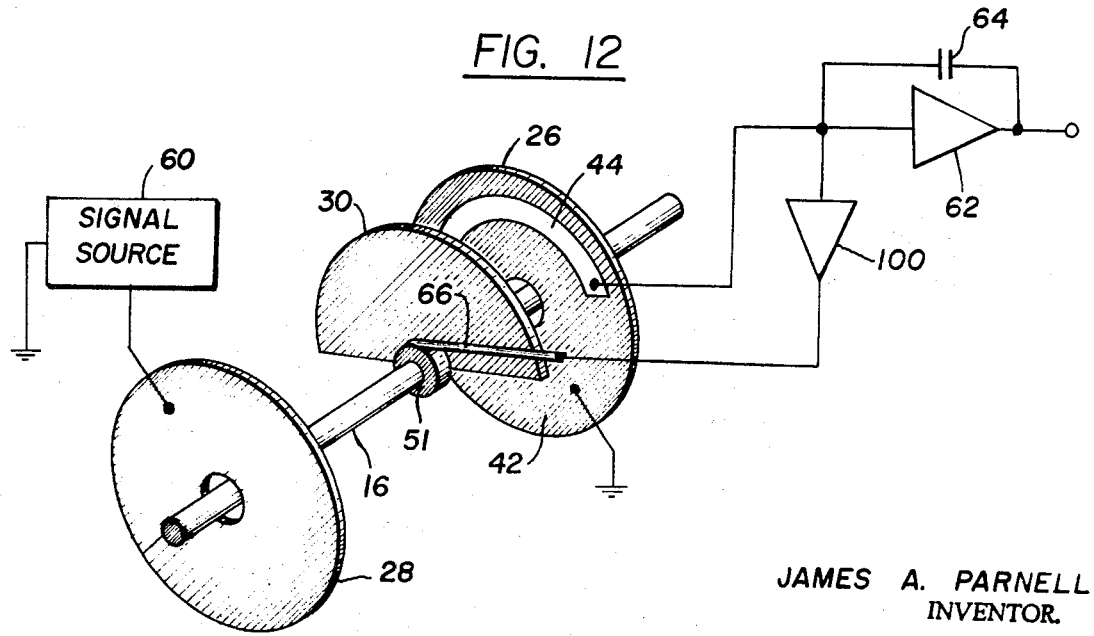
FIG. 12 is a schematic diagram of the capacitive transducer of the invention including a second embodiment of the electrical connections made thereto.
Figure 13:
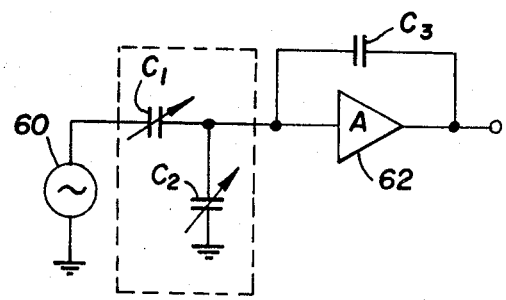
FIG. 13 is an electrical schematic diagram illustrating an equivalent circuit of the apparatus of FIG. 10.

The capacitive transducer includes two stationary mounted parallel conductive plates 26 and 28 and a movable conductive plate 30 positioned in parallel relation between the other two plates, as best seen in FIGS. 2, 10 and 12. The movable plate 30 is mounted on the shaft 16 which, in turn, is rotatably mounted in the bearings 34 and 32 located respectively in the front and back covers 14 and 12, respectively.

Figure 4:
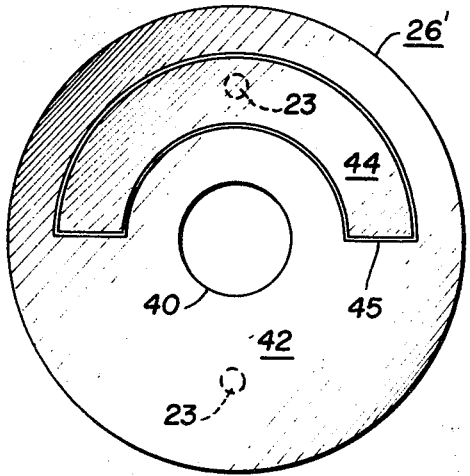
FIG. 4 is a first embodiment of an outer capacitive plate of the capacitive transducer of the invention including a single active portion.
Figure 5:
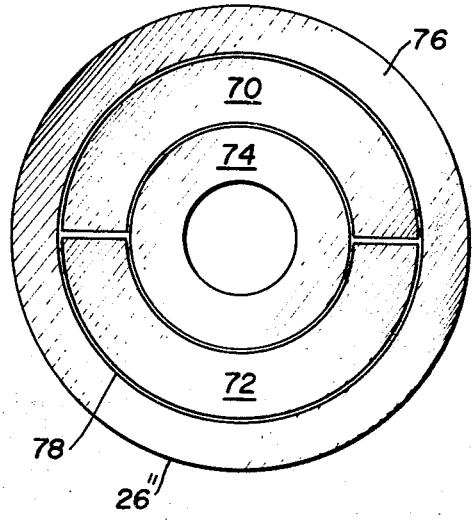
FIG. 5 is a second embodiment of an outer capacitive plate including two active portions.
Figure 6:
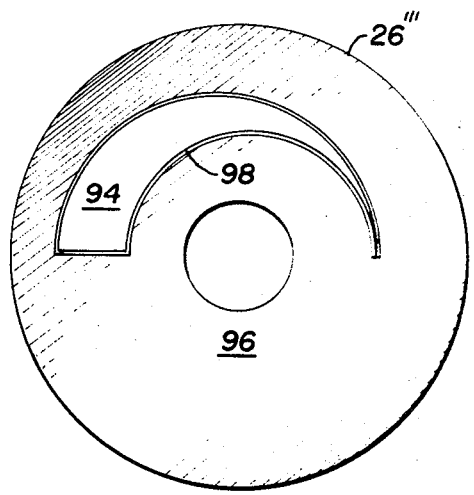
FIG. 6 is a third embodiment of an outer capacitive plate including a single non-linear active portion.

Three embodiments of the outer conductive plate 26 having varying shape are illustrated in FIGS. 4–6 as conductive plates 26', 26'' and 26''', respectively. The conductive exemplary plate 26 may, for example, be formed on a circular disk made of an insulative plastic such as that used in printed circuit boards. The disk includes an opening 40 in the center to provide clearance for the shaft 16. The conductive plate 26 comprises a thin copper film covering one side of the disk. In the embodiment of FIG. 4, the copper film of conductive plate 26' is divided into two areas, an active area 44 and a passive area 42, insulated from each other by a thin separation 45. The conductive plate 26 can be made by conventional printed board techniques. The active area 44 has an arcuate shape defined by the area between two coaxial semicircles of different diameters.

The conductive plate 26 fits within a recess 46 in the rear cover 12 with the active and passive areas, 44 and 42, facing the movable conductive plate 30 as best seen in FIG. 2. Connections to the active and passive areas of the conductive plate 26 are made by the wires 20 extending through the holes 22 in the cover 12 and the holes 23 in the plastic disk, with the wires soldered to the conductive coating.

Figure 3:
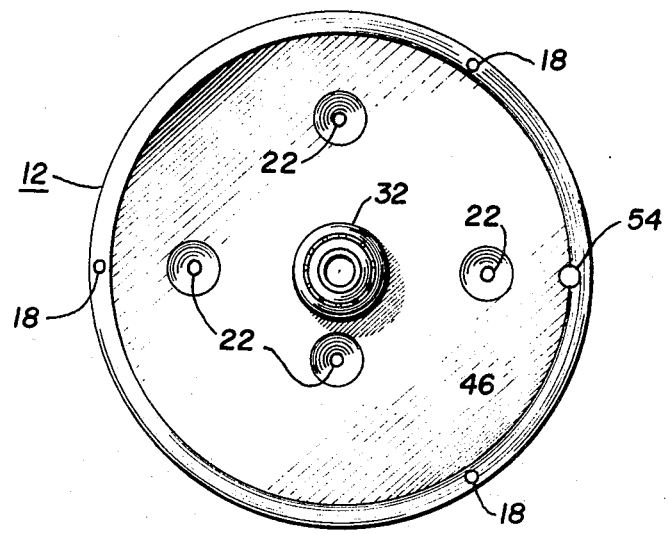
FIG. 3 is a plan view of the inner portion of the rear cover of the transducer housing of FIG. 1.
Figure 7:
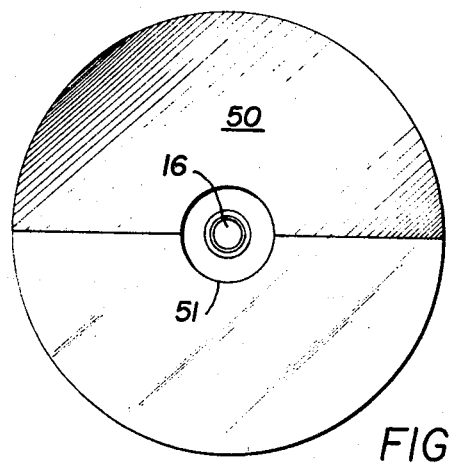
FIG. 7 is a plan view of a rotatable center conductive plate of a capacitive transducer according to the principles of the present invention.
Figure 8:
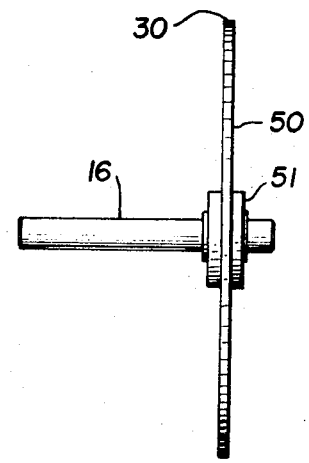
FIG. 8 is a side view of the embodiment of FIG. 7.
Figure 9:
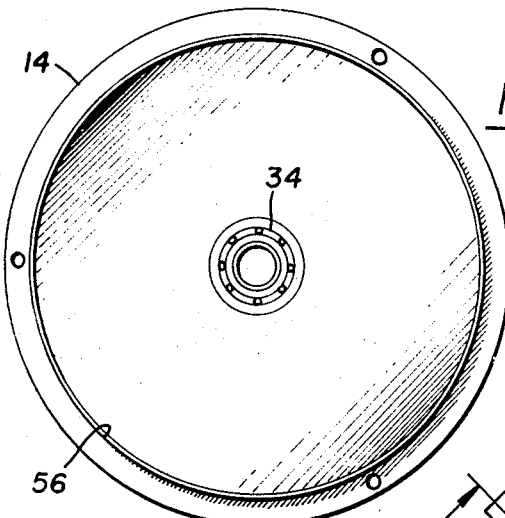
FIG. 9 is a plan view of the inner portion of the front cover of the transducer housing of FIG. 1.

The movable conductive plate 30 is also formed on a circular disk of insulative plastic. The conductive plate 30 comprises a thin copper metal coating 50 covering the top-half of the disk as viewed in FIG. 7. The conductive coating 50 is electrically connected with the shaft 16 through a metal bushing 51 as best seen in FIG. 3. The movable conductive plate 30 cooperatively rotates with the shaft 16 and is assembled in the housing so that the side with the metal coating 51 is facing towards the conductive plate 26, as shown in FIG. 2.

The second outer conductive plate 28 also is formed on a circular insulative plastic disk having the same general shape as the disk for the conductive plate 26 and comprises a single thin film of copper 52 covering the entire side facing the rotary conductive plate 30, as illustrated in FIG. 2. The conductive plate 28 is stationarily mounted in a recess 56, as shown in (FIG. 2) in the front cover 14 and electrical connections thereto are made through the hole 54, as shown in FIG. 3 in the rear cover 12.

The operation of the capacitive transducer and the electrical connections thereto will be explained with reference to FIGS. 10-14. As previously mentioned, the capacitive transducer includes three conductive plates, the stationary or outer conductive plates 26 and 28 and the movable center conductive plate 30. The stationary plate 28 is coupled to a source of alternating signals 60. The passive area 42 of the stationary plate 26 is connected to ground while the active area 44 is connected to an amplifier 62 including a capacitor 64 connected in a negative feedback circuit. The movable plate 30 is connected to ground through the bushing 51 by a slip ring contact 66, as shown in FIG. 10. Since this capacitive transducer is primarily used with periodic signals, contact potentials between the bushing 51 and the slip ring 66 have no effect on the precision of the measurements. Also, the contact resistance does not have to be closely controlled, as the close capacitance provided by the sliding contact is sufficient to effectively ground the plate 30.

The plates 26, 28 and 30 are arranged in a manner so that the movable plate 30 acts as a variable shield between the other two. Since the net capacitance in a parallel plate capacitor is directly proportional to the surface areas of the plates, the capacitance between the exemplary plates 26' and 28 is proportional to the size of the plate 28 and the portion of the active area 44 not shielded by the movable plate 30. As the plate 30 is rotated over an angle of 180°, from an initial point entirely shielding the active area 44, to a point wherein the entire active area is exposed, the capacitance between the outer plates changes linearly from a minimum value approaching zero to a maximum value after approximately 180° of rotation.

Figure 11:
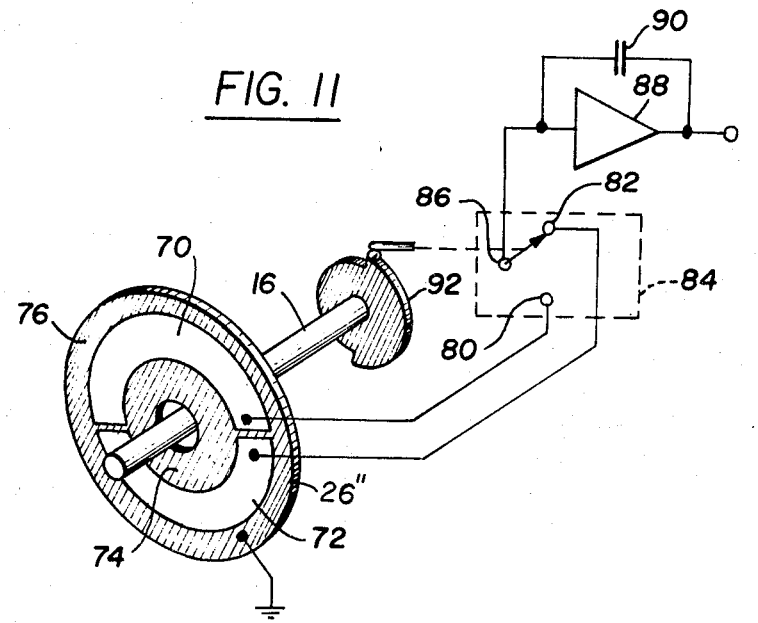
FIG. 11 is a modification of the diagram of FIG. 10 including the output plate of FIG. 5 and switching connections therefor.

If it is desirable to have a continuously rotatable capacitive transducer, the conductive plate 26 can be modified, for example, to the configuration of conductive plate 26'' as illustrated in FIG. 5, to include two active areas 70 and 72 each extending over an angle approaching 180° and each having an arcuate shape similar to that of the active area 44 of FIG. 4. The active areas 70 and 72 are insulated from each other and also are insulated from the passive areas 74 and 76 by a thin separation 78. The modified conductive plate 26'' can be connected to a switching circuit, as illustrated in FIG. 11, to provide a means for switching from one active area to the other for each 180° of rotation of the shaft 16. The passive areas 74 and 76 are grounded while the active areas 70 and 72 are connected to the separate contacts 80 and 82, respectively, of a switch 84. The movable contact 86 is connected to the input circuit of an amplifier 88 including a capacitor 90 connected in the negative feedback circuit. The switch 84 is mechanically coupled to a cam 92 which rotates with the shaft 16 to switch from one active area to the other for each 180° of rotation.

If a non-linear output signal versus shaft 16 rotation is desired, the conductive plate 26 can be modified, for example, in a manner as illustrated in FIG. 6 to form the conductive plate 26'''. The active area 94 has the form of a curved wedge and is insulated from the passive area 96 by a thin separation 98. As the shaft 16 is rotated, a signal is developed by the amplifier circuit connected to the active area 94 that varies non-linearly in amplitude as a function of the rotation of the shaft 16.

It is highly desirable that the distance $d_1$ between the plates 26 and 30, as shown in FIG. 10, be small compared to the length or circumference of the active area on the exemplary plate 26'. This minimizes any curvature of fringing effect in the field between the plates 26 and 28. This fringing effect is otherwise noticeable at the ends of the range of the movable plate 30 in the case of the linear active area 44, or throughout the range of movement of the plate 30 in the case of the non-linear active area 94 of FIG. 6.

When the plates 26 and 30 are placed close together, the capacitance between the plate 30 and the active area 44 becomes quite large compared to the capacitance between the plates 26 and 28, especially when the plate 30 covers the entire active area 44. In effect, a capacitive divider is formed as illustrated within the dashed lines of FIG. 13. The variable capacitor $C_1$ corresponds to the capacitance between the plates 26 and 28 and the variable capacitor $C_2$ corresponds to the capacitance between the plate 30 and the active area 44. The size of the capacitors $C_1$ and $C_2$ vary inversely with respect to each other as the shaft 16 is rotated. In order to have an accurate indication of the capacitance between the plate 28 and the active area 44 as a function of the rotation of the shaft 16, the effect of the capacitance $C_2$ must be eliminated or minimized to a point wherein it is negligible.

The effect of the capacitor $C_2$ is minimized in the capacitive transducer of the invention by effectively maintaining the plate 30 and the active area 44 at substantially the same signal potential. This is accomplished illustrated in FIG. 10, by connecting the active area 44 to the input circuit of the high gain amplifier 62 including a negative feedback circuit comprising a capacitor 64 so that the input circuit is maintained at "virtual ground", i.e., substantially zero signal level. Capacitor 64 is illustrated as capacitor $C_3$ in FIG. 13. Since the movable plate 30 is grounded and the active area 44 is maintained at virtual ground, there is practically no A.C. or signal field between the two plates.

The effective input impedance of the amplifier connected to the active area 44 looks like a capacitor $C_{eff}$ wherein:

$$C_{eff} = C_3 A_v \qquad (1)$$

and $A_v$ is the open loop gain of the amplifier. It has been found that the value of $C_{eff}$ can be made at least three orders of magnitude greater than the maximum value of $C_2$, which occurs with the active area 44 completely shielded by the plate 30.

Accordingly, errors due to $C_2$ are less than 0.1%, and the output from the amplifier (Vo) can be approximated to be:

$$V_o = V_s C_1/C_3, \qquad (2)$$

where $V_s$ is the input signal amplitude applied to the plate 28.

Figure 14:
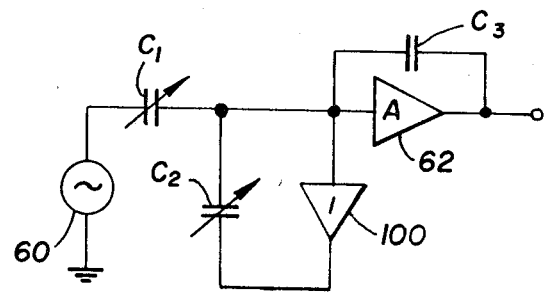
FIG. 14 is an electrical schematic diagram illustrating an equivalent circuit of the apparatus of FIG. 12.

If extremely small spacing ($d_1$) is provided between the active area 44 and the plate 30, it may be desirable to utilize a "bootstrapping" technique, as illustrated in FIG. 12, to insure sufficient linearity. In this case the bushing 51 is electrically connected to the plate 30 but insulated from the shaft 16. As in FIG. 10, the active area 44 is connected to the amplifier 62 and the input signals from the source 60 are applied to the plate 28. The active area 44 in FIG. 12 is also connected to the input circuit of a unity gain amplifier 100. The output circuit of the amplifier 100 is connected to the slip ring contact 66. The unity gain amplifier 100 assures that there will be effectively no potential difference between the movable plate 30 and the active area 44, thus effectively cancelling the effect of the capacitor $C_2$. An equivalent circuit diagram of this capacitive transducer is illustrated in FIG. 14 where the capacitor 64 is schematically illustrated as capacitor $C_3$. By effectively maintaining the same signal on both plates of the capacitor $C_2$ any signal field therebetween is minimized.

It should be noted in the embodiments of the transducer of FIGS. 10–12, since the plate 30 and the active area 44 are maintained at substantially the same signal level and the capacitance therebetween is accordingly effectively eliminated, small movements of the plate 30 towards or away from the exemplary plates 26' and 28 produces no undesirable effects. As a result, only separation between the fixed plates 26 and 28 must be carefully controlled. In addition, the plate 30 may have a fair degree of freedom in its movement towards or away from the plates 26' and 28. Any force transversely directed with respect to the axis of the shaft 16 tending to change the parallel position of the plate 30 will produce little or no error. In contrast, the non-contacting transducers of the prior art require very accurate control of the movable element with respect to the stationary elements and hence are sensitive to forces transverse to the usual direction of movement.

Although the present disclosure has been primarily directed to a system wherein the outer conductive plates of the transducer have been maintained stationary and the inner conductive plate moved, it is to be understood that the capacitive transducer will also function by maintaining the center plate 30 stationary and rotating the two outer plates 26 and 28 in unison. Alternatively, the plates 28 and 30 can be held stationary and the plate 26 including the active area rotated with respect to the other two.

The output from the amplifiers of FIGS. 10–14 is an alternating voltage of the same form as that provided by the input signal source 60. In most cases the alternating voltage will be converted to a direct current signal. This can be accomplished by precision rectifying circuits using high gain direct current amplifiers with rectifiers in the feedback circuit. For maximum accuracy and lowest ripple the signal source should produce square wave signals. The use of this square wave signal simplifies the regulation of the amplitude of the input signal. The frequency stability of the signal source is not critical since the transfer function of the system is a ratio of capacitive reactances.

Although the capacitive transducer of the invention has been described by applying an input signal to the plate 28 and deriving an output signal from the active area 44, it is to be understood that the connections can be reversed. The input signal from the source 60 can also be applied to the active area 44 and the plate 28 connected to the input circuit of the amplifier 62. The result would be a variation in effective area of the driving plate rather than the area of the sensing plate connected to the input of the amplifier 62.

Figure 15:
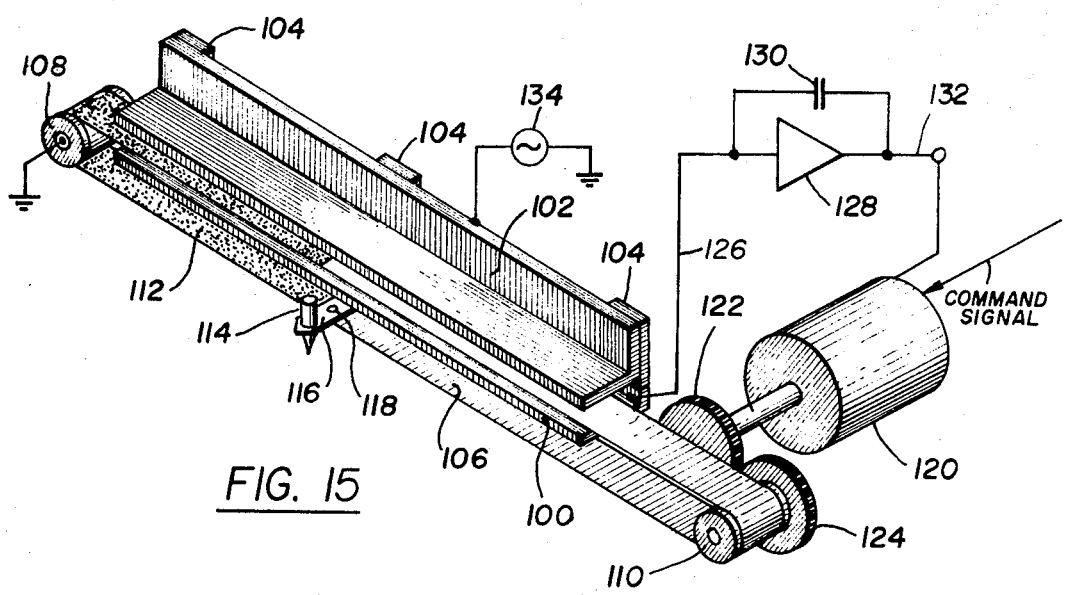
FIG. 15 is a perspective view of the invention as employed in a graphical recording device.

FIG. 15 illustrates another embodiment of the present invention wherein the capacitive transducer has been adapted, in a graphical recorder, to work in conjunction with the recording pen drive mechanism. Two conductive plates 100 and 102 are mounted parallel to one another and are supported in this relationship by a plurality of insulating retainers 104. A thin, flexible belt 106, supported on either end by rollers 108 and 110, is movably mounted between the plates 100 and 102. The belt 106, which is made of an insulating material such as mylar, is partially coated with a film 112 of conductive material. The recording pen 114 is fastened to belt 106 for travel therewith by carriage 116 and fastener 118.

In operation, the belt 106 is driven by servo motor 120 through gears 122 and 124 which drives roller 110. The conductive film 112 of belt 106 is made sufficiently long enough so that it contacts roller 108, which is grounded, regardless of the position of pen 114. Generally, the pen is advanced no further than the ends of plates 100 and 102.

Upon receipt of a command signal, servo amplifier and motor 120 will cause belt 106 to advance pen 114 to a desired position. At that position, or at any other pen position, the capacitive coupling between plates 100 and 102 is a function of the degree of shielding resulting from the presence between the plates 100 and 102 of some portion of the conductive film 112. With the conductive film 112 grounded, as a result of passing over roller 108, and the output plate, in this example plate 100, kept at virtual ground by amplifier 128 and capacitor 130, there is virtually no error introduced by movement of belt 106 perpendicular to its normal direction of travel. Thus, even though belt 106 may stretch over a period of time, the resultant sag will not affect operation of the recorder nor will repeated movement of belt 106 over just a small portion of its potential travel.

As with the previously described embodiments of the present invention, the signal source 134 is introduced via input plate 102. With the output or shielded plate 100 held at substantially a zero signal level with respect to the input 126 of amplifier 128 and the movable plate or conductive film 112 grounded, the signal appearing on line 132 can be utilized to accurately locate via error signal feedback to servo amplifier motor 120 the position of pen 114 to fulfill the command signal requirement of advancing the pen to a desired position, as hereinbefore mentioned. By using belt 106 as both a transducer element and pen conveyor it is not necessary to convert the linear motion of pen 114 to rotary motion in order to null any error signals and have pen 114 end up in its desired position. This avoids the use and cost of additional gears, pulleys, cables, etc., and the mechanical errors, such as backlash, cable stretch, misalignment of parts, etc., associated with such elements. With the pen 114 and feedback element rigidly connected, errors of this sort cannot occur since the chief source of errors in most servo systems involve the feedback element and the mechanical coupling between it and the output device, pen 114. Other advantages of the embodiment illustrated in FIG. 15 result from the use of rectangular rather than semicircular critical shapes which yields simplified construction and alignment, as well as good linearity of output voltage.

The capacitive transducer of the invention is a non-contacting transducer of infinite resolution, excellent linearity, repeatability and stability. The transducer can generate various non-linear input-to-output relationships. Furthermore, since the transducer does not have any critical sliding contacts, there is no wear problem and the friction loading is minimized. In addition to the foregoing, since the capacitive transducer requires three conductive plates which can for example be formed using printed circuit techniques and since the axial position of the movable element does not have to be critically maintained, the transducer of the invention can be relatively inexpensively built nand still provide a high degree of linearity, stability, repeatability and infinite resolution as required.

What is claimed is:

1. Apparatus for driving the recording pen of a graphical recorder, comprising:
   a. a fixedly mounted first conductive element;
   b. a fixedly mounted second conductive element mounted parallel to said first conductive element and coextensive lengthwise therewith;
   c. a pair of rollers, one of which is electrically grounded, mounted beyond the ends of said conductive elements having their upper surfaces in a plane located between and generally parallel to said conductive elements;
   d. servo means responsive to command signals including drive means connected to at least one of said rollers for rotation thereof;
   e. a non-conductive belt looped about said rollers for rotation therewith;
   f. recording pen retaining means fastened to said non-conductive belt for movement therewith between the ends of said conductive elements;
   g. a conductive film on said non-conductive belt of sufficient length so that said conductive film contacts said grounded roller regardless of the position of said recording pen;
   h. a source of periodic signals connected to one of said conductive elements; and
   i. first circuit means connected to the other of said conductive elements and said servo means for developing output electrical signals having an amplitude determined by the position of said recording pen, including means for maintaining said conductive element connected to said first circuit means at a substantially zero signal level with respect to the conductive film on said belt.

2. Apparatus as defined in claim 1, wherein said last mentioned means for maintaining said conductive element to which said first circuit means is connected at a substantially zero signal level comprises means for providing an effective capacitance in shunt with the capacitance between said conductive element connected to said first circuit means and said conductive film, said effective capacitance being sufficiently larger than said capacitance between said conductive film and said other conductive element so that said last mentioned conductive element is maintained at a substantially zero signal level with respect to the conductive film on said belt.

3. Apparatus as defined in claim 1, wherein said first circuit means includes an amplifier circuit having a negative feedback circuit connected therearound, said conductive element connected to said first circuit means being coupled to the input circuit of said amplifier circuit so that said conductive element connected to said first circuit means is maintained at a substantially zero signal level with respect to the conductive film on said belt.

4. Apparatus as defined in claim 3, wherein said negative feedback circuit includes capacitive means coupled between the input and output circuits of said amplifier circuit.

5. Apparatus for driving the recording element of a recording device to a predetermined position, comprising:
   a. a first conductive element for connection to a source of input electrical signals;
   b. a second conductive element positioned adjacent said first conductive element, substantially parallel thereto;
   c. a non-conductive transport mechanism having said recording element mounted thereto;
   d. a conductive strip carried by said transport mechanism for movement between said first and second conductive elements;
   e. first circuit means for maintaining said conductive strip at a substantially zero signal level;
   f. servo means responsive to command signals including drive means connected to said transport mechanism for changing the relative position between said conductive strip and at least one of said first and second conductive elements; and
   g. second circuit means having its input connected to said second conductive element and its output connected to said servo means for developing output electrical signals having an amplitude as a function of the position of said recording element, including means for maintaining said second conductive element at a substantially zero signal level with respect to said conductive strip carried by said transport mechanism.

6. Apparatus as defined in claim 5, wherein said second circuit means for maintaining said second conductive element at a substantially zero signal level comprises means for providing an effective capacitance in shunt with the capacitance between said second conductive element and said conductive strip, said effective capacitance being sufficiently larger than said capacitance between said second conductive element and said conductive strip so that said second conductive element is maintained at a substantially zero signal level with respect to said conductive strip.

7. Apparatus as defined in claim 5, wherein said second circuit means includes an amplifier circuit having a negative feedback circuit connected therearound, said second conductive element being coupled to the input circuit of said amplifier circuit so that said second conductive element is maintained at a substantially zero signal level with respect to the conductive strip.

8. Apparatus as defined in claim 7, wherein said negative feedback circuit includes capacitive means coupled between the input and output circuits of said amplifier circuit.

* * * * *